United States Patent
Cora et al.

(10) Patent No.: US 7,681,553 B2
(45) Date of Patent: Mar. 23, 2010

(54) NESTED THREE CHAMBERS, FLUID PULSATION DAMPENER

(75) Inventors: Sorin Cora, Orange, CA (US); John E. Kaiser, Huntington Beach, CA (US); Richard J. Serocki, Costa Mesa, CA (US)

(73) Assignee: Pulsco, Inc., Irvine, CA (US)

( * ) Notice: Subject to any disclaimer, the term of this patent is extended or adjusted under 35 U.S.C. 154(b) by 47 days.

(21) Appl. No.: 12/189,653

(22) Filed: Aug. 11, 2008

(65) Prior Publication Data

US 2009/0050111 A1    Feb. 26, 2009

Related U.S. Application Data

(60) Provisional application No. 60/955,283, filed on Aug. 10, 2007.

(51) Int. Cl.
*F02M 69/46* (2006.01)
*F02M 59/46* (2006.01)
*F16L 55/04* (2006.01)

(52) U.S. Cl. ............ 123/456; 123/467; 123/468; 138/26; 138/31

(58) Field of Classification Search ........... 123/456, 123/467, 468, 469; 138/26–31
See application file for complete search history.

(56) References Cited

U.S. PATENT DOCUMENTS

| | | | | |
|---|---|---|---|---|
| 2,993,559 | A | | 7/1961 | Everett |
| 4,201,522 | A | * | 5/1980 | Toyota et al. ............ 417/311 |
| 4,611,633 | A | * | 9/1986 | Buchholz et al. ........... 138/26 |
| 4,922,958 | A | * | 5/1990 | Lemp ................. 137/561 A |
| 5,845,621 | A | * | 12/1998 | Robinson et al. ........... 123/456 |
| 6,009,854 | A | * | 1/2000 | Rosgren et al. ............ 123/456 |
| 6,478,053 | B2 | * | 11/2002 | Zanardi ................... 138/30 |
| 6,591,870 | B1 | * | 7/2003 | Bhattacharyya et al. ..... 138/26 |
| 6,761,150 | B2 | * | 7/2004 | Zdroik ................... 123/456 |
| 7,017,610 | B2 | * | 3/2006 | Zimpfer et al. ............ 138/30 |
| 7,325,570 | B1 | * | 2/2008 | Krieger .................. 138/26 |
| 2003/0155026 | A1 | * | 8/2003 | Michlin et al. ............ 138/26 |

* cited by examiner

*Primary Examiner*—Thomas N Moulis
(74) *Attorney, Agent, or Firm*—Orrick, Herrington & Sutcliffe LLP

(57) ABSTRACT

A reactive acoustic dampener includes a nested three chambered configuration and connecting tubes that may be fully integrated into the fuel rail of a fuel injection system.

21 Claims, 1 Drawing Sheet

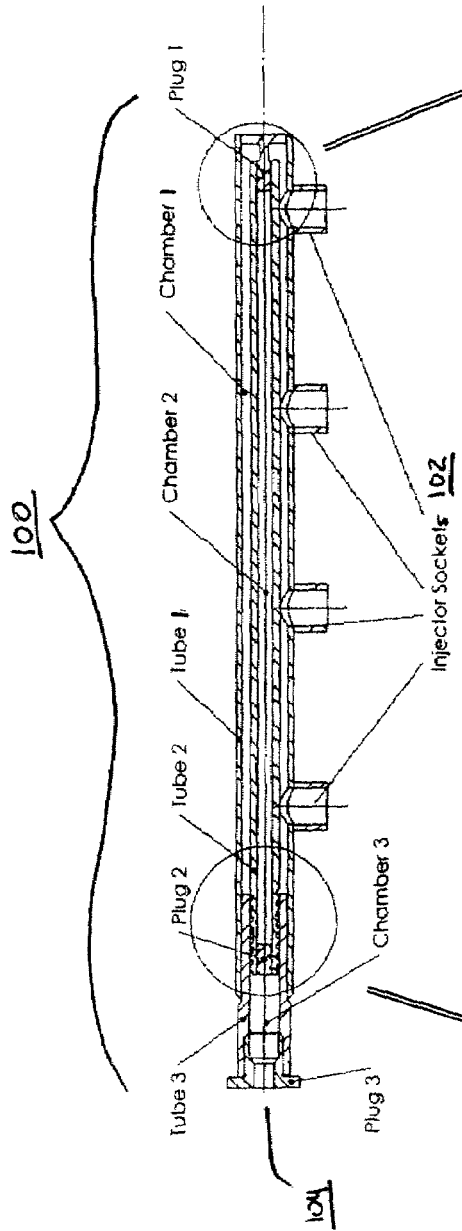
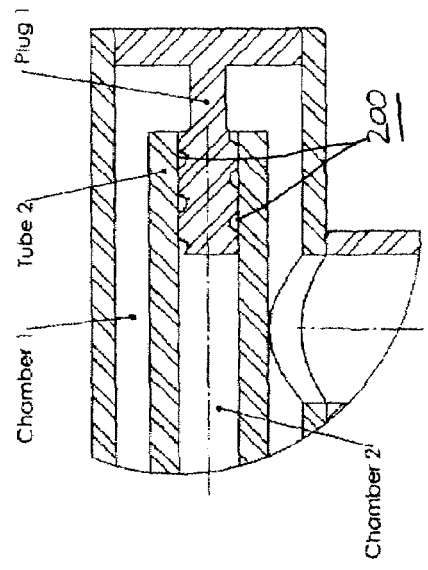
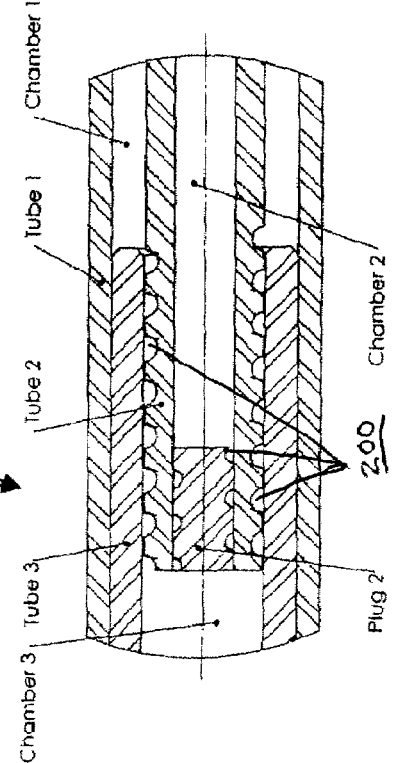
Figure 1
Figure 3
Figure 2

NESTED THREE CHAMBERS, FLUID PULSATION DAMPENER

CROSS-REFERENCE TO RELATED APPLICATIONS

This application claims priority to U.S. provisional patent application Ser. No. 60/955,283, filed on Aug. 10, 2007, which is fully incorporated herein by reference.

FIELD

This present disclosure relates generally to acoustic filters and more particularly, to multi-chambered acoustic filters configured with connecting tubes that are less costly to manufacture.

BACKGROUND

Acoustic filters are used to dampen pulsation vibrations in fluid flow systems. It has been the practice (see, e.g., U.S. Pat. No. 2,993,559 to Everett) to provide an internal flow element within a vessel arranged to divide and recombine flowing fluids to offset and cancel pulsations. This has been accomplished by defining separate flow paths by means of bulkheads and connecting tubes.

As is well known in the art, whenever fluids are pumped under high pressure, pulsating vibrations will undoubtedly occur. High intensity noise may also occur in systems that produce high frequency pulsations. In addition to noise and vibration, there exists a possibility that the vibrations will damage system piping or components. The potential damage necessitates incurring substantial maintenance and equipment replacement costs. Thus, there is a need for an fluid pulsation dampener that operates quietly and efficiently, and prevents component deterioration as described above.

SUMMARY

The various embodiments and examples provided herein are generally directed to acoustic dampener systems. The disclosed embodiments generally describe a fluid pulsation dampener that substantially attenuates pulsations in a given frequency range. The disclosed embodiments permit acoustic dampeners to have smaller overall dimensions and may be economically produced and implemented. This is largely accomplished by the three-chamber structure described below, wherein there are few inner bulkheads and shorter connecting tubes.

Moreover, the disclosed embodiments may be used as a fluid pulsation dampener for fuel injection systems. Typically, fuel injection systems generate modest amount of noise and vibration. By incorporating the disclosed pulsation dampener into the fuel rail of a fuel injection system, it may attenuate the fluid pulsations and vibrations generated by the fuel injectors of the internal combustion engine.

These, as well as other objects, features and benefits will now become clear from a review of the following detailed description of illustrative embodiments and the accompanying figures.

BRIEF DESCRIPTION OF THE DRAWINGS

Aspects of the present invention are illustrated by way of example, and not by way of limitation, in the accompanying drawings wherein:

FIG. 1 is a longitudinal cross-sectional view of the acoustic dampener, integrated in the Fuel Rail of a Fuel Injection System;

FIG. 2 is a cross-sectional view of the connecting area of Chamber 1, Chamber 2, and Chamber 3 through the helical grooves machined in Plug 2 and Tube 2; and FIG. 3 is a cross-sectional view of connecting area of Chamber 1 and Chamber 2 through the helical groove machined in Plug 1.

DETAILED DESCRIPTION

The detailed description set forth below in connection with the appended figures is intended as a description of various embodiments of the invention disclosed herein and is not intended to represent the only embodiments in which the invention may be practiced. The detailed description includes specific details for providing a thorough understanding of the invention. It will be apparent to those skilled in the art, however, that the invention may be practiced without these specific details.

FIG. 1 is a longitudinal cross-sectional view of an acoustic dampener. For purposes of this disclosure, acoustic dampener and pulsation dampener may be used interchangeably without straying from the spirit of the exemplary embodiment herein since both acoustic and pulsation dampeners have the ability to carry sound. In one exemplary embodiment, the acoustic dampener 100 is integrated into the fuel rail of a fuel injection system. The pulsation dampener 100 consists of Tube 1, which is the fuel rail with attached injector sockets 102. Tube 2 is lodged inside Tube 1 in a coaxial arrangement, defining an annular Chamber 1, which is the pulsation inlet for the un-dampened pulsations generated by the injectors (not shown) in the injector sockets 102. In the exemplary embodiment, the fluid inlet 104 designates the area where the fluid enters the dampener 100, while pulsations inlet, i.e. Chamber 1, designates the area where the pulsations enter the dampener 100. The fluid inlet 104 and the pulsation inlet may or may not be identical in structure, depending on the pulsation's source location.

FIG. 2 is a cross-sectional view of the connecting area of Chamber 1, Chamber 2, and Chamber 3 through the helical grooves 200 machined in Plug 2 and Tube 2. Tube 3, which is partially inserted in Tube 1, provides the second support for Tube 2 inside Tube 1. Plug 3, inserted into the opposite end of Tube 3, is the fluid inlet port 104 of the pulsation dampener 100. Plug 3 also seals Chamber 3 inside Tube 3. (See FIG. 1). The three expansion chambers (Chamber 1, Chamber 2 and Chamber 3) work in cooperative fashion so as to substantially cancel or eliminate unwanted noise that may arise from the acoustic or pulsation properties of fluid flow.

In the disclosed embodiment, the un-dampened pulsations may enter either Chamber 1 or Chamber 2, wherein one is placed inside the other. Chamber 3, which can also be a partition of Chamber 1 or Chamber 2, is the outlet for the dampened pulsations. The series of connecting tubes in the disclosed arrangement may allow fluid flow in and out of the chambers (Chamber 1, Chamber 2, and Chamber 3) or, alternatively, split and recombine the flow in a predefined sequence.

FIG. 3 is a cross-sectional view of connecting area of Chamber 1 and Chamber 2 through the helical groove 200 machined in Plug 1. Plug 1 seals the end of Tube 1 and Tube 2 and provides support for Tube 2 inside Tube 1. The opposite end of Tube 2, having a helical groove 200 on its outer surface, is inserted into Tube 3 and plugged by the Plug 2. (See FIG. 2).

The connecting tubes (Tube 1, Tube 2, and Tube 3) of the exemplary embodiment are the helical grooves 200 machined on the outer surfaces of Plug 1 and Plug 2 and on the outer surface of the fluid inlet end of Tube 2 (See FIGS. 2 and 3). Plug 1 connects Chamber 1 and Chamber 2 while Plug 2 connects Chamber 2 and Chamber 3. Chamber 1 and Chamber 3 are connected by the helical groove 200 at the end of Tube 2. In an exemplary embodiment, the connections between the tubes may be largely accomplished by friction fit between the helical groove 200 structure and the immediately surrounding tube. As one of ordinary skill in the art may appreciate, one may substitute an equivalent structure so as to bond the connecting tubes together without deviating from the scope of the disclosed embodiments.

While the specification describes particular embodiments of the present invention, those of ordinary skill can devise variations of the present invention without departing from the inventive concept. Also, the previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the language of the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

We claim:

1. A pulsation dampener comprising:
    a first outer tube having at least one socket;
    an inner tube in coaxial arrangement with said first outer tube, said inner tube having a first end and a second end, wherein said second end has a helical groove on its external surface;
    a stem of a first plug supporting said inner tube at said first end, said stem having a helical groove on its outer surface;
    a cylindrical second plug inserted at said second end, said cylindrical second plug having a helical groove its outer surface; and
    a second outer tube having one end partially inserted into an end of said first outer tube and concentrically placed over said second end of said inner tube.

2. The pulsation dampener of claim 1, wherein said inner tube and said first outer tube define a first inner volume sealed at said first end by said stem of said first plug and said cylindrical second plug at said second end.

3. The pulsation dampener of claim 2, wherein said helical grooves of said stem, first plug, and cylindrical second plug allow for the transmission of a fluid.

4. The pulsation dampener of claim 3, wherein said second outer tube is sealed by a third plug at an end opposite to said inner tube.

5. The pulsation dampener of claim 4, wherein said third plug has inner threads to accommodate a fluid inlet port.

6. The pulsation dampener of claim 5, wherein said third plug further defines a second inner volume in said second outer tube.

7. The pulsation dampener of claim 6, wherein said helical groove of said cylindrical second plug allows for the transmission of fluid from said second inner volume to said first inner volume.

8. The pulsation dampener of claim 7, wherein said helical groove of said inner tube allows for the transmission of fluid from said second inner volume to said annular volume.

9. The pulsation dampener of claim 8, wherein said first outer tube is a machined cavity for use in a hydraulic or engine or block.

10. The pulsation dampener of claim 9, wherein said at least one socket is radially attached.

11. The pulsation dampener of claim 10, wherein said at least one socket is configured for coupling to a radial injector.

12. The pulsation dampener of claim 11, wherein said pulsation dampener is configured for use as a fuel rail in a fuel injection system.

13. A pulsation dampener for fuel injection systems comprising:
    a first outer tube having at least one radial injector socket;
    an inner tube in coaxial arrangement with said first outer tube, said inner tube having a first end and a second end, wherein said second end has a helical groove about its outer surface;
    a stem of a first plug inserted in said inner tube at said first end, said stem having a helical groove on its outer surface, wherein said stem supports said inner tube;
    a cylindrical second plug inserted at said second end, said cylindrical second plug having a helical groove on its outer surface; and
    a second outer tube having one end partially inserted into an end of said first outer tube and placed over said second end of said inner tube.

14. The pulsation dampener for fuel injection systems of claim 13, wherein said inner tube and said first outer tube define a first inner volume sealed at said first end by said stem of said first plug and said cylindrical second plug at said second end.

15. The pulsation dampener for fuel injection systems of claim 14, wherein said helical grooves of said stem, first plug, and cylindrical second plug allow transmission of a fluid.

16. The pulsation dampener for fuel injection systems of claim 15, wherein said second outer tube is sealed by a third plug at an end opposite to said inner tube and accommodates a fluid inlet port.

17. The pulsation dampener for fuel injection systems of claim 16, wherein said third plug further defines a second inner volume in said second outer tube and further wherein said helical groove of said cylindrical second plug allows transmission of fluid between said second inner volume and said first inner volume and said helical groove of said first inner tube allows for the transmission of fluid between said second inner volume and said annular volume.

18. A reactive pulsation dampener for fuel injection systems comprising:
    a hollow first outer tube having at least one radial injector socket, said first outer tube lodging inside a smaller hollow inner tube, said inner tube being supported and plugged at one end by the stem of a first plug, said inner tube and said first outer tube defining an annular volume sealed at one end by the said first plug and communicating with the first inner volume of said inner tube through helical grooves machined on the cylindrical surface of the stem of said first plug, said inner tube being plugged at the opposite end by a cylindrical second plug, said second plug having a helical groove machined on its outer surface; and a hollow second outer tube, having one end partially inserted in the opposite end of said first outer tube and concentrically placed over the other end of said inner tube, said second outer tube being sealed at the opposite end by a third plug which has inner threads to accommodate the fluid inlet port of the dampener, said third plug also defining a second inner volume in the said second outer tube, said second inner volume communicating with the said first inner volume through the helical groove of said second plug and with the said annular volume through the groove of said first inner tube.

19. The reactive Pulsation Dampener of claim 18, wherein said second inner volume is defined as being between two helically grooved plugs placed inside said inner tube and the length of the second outer tube is reduced to the minimum necessary to accommodate the fluid inlet port.

20. The reactive Pulsation Dampener of claim 18, wherein the outer hollow tub is any appropriately machined or cast cavity in a hydraulic or engine or block.

21. The reactive Pulsation Dampener of claim 19, wherein the outer hollow tub is any appropriately machined or cast cavity in a hydraulic or engine or block.

* * * * *